US005489326A

United States Patent [19]
Thomas et al.

[11] Patent Number: 5,489,326
[45] Date of Patent: Feb. 6, 1996

[54] GOLD RECOVERY USING CONTROLLED OXYGEN DISTRIBUTION PRESSURE OXIDATION

[75] Inventors: Kenneth G. Thomas, Mississauga, Canada; Herman J. H. Pieterse, Elko, Nev.; Richard A. Williams, Elko, Nev.; Andrew W. Bolland, Elko, Nev.

[73] Assignee: Barrick Gold Corporation, Toronto, Canada

[21] Appl. No.: 317,475

[22] Filed: Oct. 4, 1994

[51] Int. Cl.⁶ .................................................. C22B 3/04
[52] U.S. Cl. .................... 75/744; 423/27; 423/29
[58] Field of Search ........................ 423/27, 29; 75/744

[56] References Cited

U.S. PATENT DOCUMENTS

| T104,001 | 3/1984 | Kunter et al. | 75/118 |
|---|---|---|---|
| 2,777,764 | 1/1957 | Hedley et al. | 75/105 |
| 3,961,908 | 6/1976 | Touro | 23/290 |
| 4,038,362 | 7/1977 | Guay | 423/40 |
| 4,188,208 | 2/1980 | Guay | 75/105 |
| 4,259,107 | 3/1981 | Guay | 75/105 |
| 4,289,532 | 9/1981 | Matson et al. | 75/105 |
| 4,304,644 | 12/1981 | Victorovich et al. | 204/108 |
| 4,552,589 | 11/1985 | Mason et al. | 75/105 |
| 4,571,263 | 2/1986 | Weir et al. | 75/101 |
| 4,571,264 | 2/1986 | Weir et al. | 75/101 |
| 4,578,163 | 3/1986 | Kunter et al. | 204/110 |
| 4,605,439 | 8/1986 | Weir | 75/118 |
| 4,606,763 | 8/1986 | Weir | 75/101 |
| 4,606,766 | 8/1986 | Berezowsky et al. | 75/118 |
| 4,610,724 | 9/1986 | Weir et al. | 75/118 |
| 4,632,701 | 12/1986 | Berezowsky et al. | 75/118 |
| 4,738,718 | 4/1988 | Bakshani et al. | 75/105 |
| 4,979,987 | 12/1990 | Mason et al. | 75/744 |
| 5,071,477 | 12/1991 | Thomas et al. | 75/744 |
| 5,250,273 | 10/1993 | Hornsey et al. | 423/27 |

FOREIGN PATENT DOCUMENTS 969763  6/1975  Canada .

OTHER PUBLICATIONS

Gormely et al., Pressure Oxidation—A New Tool for Refractory Gold Ores and Concentrates, Canadian Mineral Processors Meeting, Vancouver, B.C., Nov. 30, 1984.
Hayden et al., Refractory Gold Ore Oxidation—Simulation of Continuous Flow, 26th Annual Conference of Metallurgists, 1987, Winnipeg, Manitoba.
Berezowsky et al., Pressure Oxidation Pretreatment of Refractory Gold, Minerals and Metallurgical Processing, May, 1984, pp. 1–4.
Thomas, Barrick Gold Autoclaving Processes, World Gold 1991, Apr. 21–25, pp. 87–97.
Thomas, Alkaline and Acidic Autoclaving of Refractory Gold Ores, JOM, Feb. 1991, pp. 16–20.
Fraser et al., The Goldstrike Pressure Oxidation Plant Process and Engineering Design, Construction and Commissioning, CIM Bulletin, Jan. 1992, pp. 33–42.
Pieterse et al., Barrick Goldstrike Pressure Oxidation Modelling, 32nd Annual Conference of Metallurgists, Aug. 28–Sep. 2, 1993, Quebec City, Quebec, pp. 1–14.
Berezowsky et al., The Commercial Status of Pressure Leaching Technology, Journal of Mining, Feb. 1991, pp. 9–15.
Turney et al., The Application of Acid Pressure Oxidation to the McLaughlin Refractory Ore, Precious Metals 1989, pp. 25–45.
Collins et al., The Behaviour and Control of Arsenic in the Pressure Oxidation of Uranium and Gold Feedstocks, AIME Annual Meeting, Phoenix, Arizona, Jan. 25–28, 1988.

(List continued on next page.)

*Primary Examiner*—Melvyn Andrews
*Attorney, Agent, or Firm*—Senniger, Powers, Leavitt & Roedel

[57] ABSTRACT

A process for recovering gold from a refractory auriferous ore containing sulfide sulfur. An aqueous slurry of refractory auriferous ore is subjected to pressure oxidation in an autoclave while the distribution of oxygen to the various compartments of the autoclave is controlled in order to achieve increased oxygen utilization.

24 Claims, 3 Drawing Sheets

OTHER PUBLICATIONS

Weir et al., Aqueous Pressure Oxidation of Refractory Gold Feedstocks, 26th Annual Conference of Metallurgists, Winnipeg Manitoba, Aug. 1987.

Weir et al., Refractory Gold: The Role of Pressure Oxidation, International Conference on Gold, Sep. 15–19, 1986.

Weir et al., Gold Extraction from Refractory Concentrates, 14th Annual Hydrometallurgical Meeting, Oct., 1984.

Berezowsky et al., Pressure Hydrometallurty—Its Use in the Recovery of Uranium and Gold, Randol Workshop Innovations in Gold and Silver Recovery Phase II, Canada, Oct. 13–15, 1982, pp. 1–19.

Berezowsky et al., The Sao Bento Gold Project Pressure Oxidation Process Development, Projects '88, 18th Annual Meeting, Hydrometallurgy Section of Metallurgical Society of the Canadian Institute of Mining and Metallurgy, Edmonton, Alberta, May 1988, pp. 1–24.

Weir et al., Porgera Gold Project Process Development, The 115th Annual Meeting of AIME, New Orleans, Mar. 1986, pp. 1–24.

Weir et al., Gold Extraction From Refractory Concentrates, Sherritt Gordon Mines Limited, Oct. 1984, pp. 1–26.

Berezowsky et al., Pressure Oxidation for Treating Refractory Uranium and Gold Ores, 22nd Annual Conference of Metallurgists of the Canadian Institute of Mining and Metallurgy Edmonton, Alberta, Aug. 1983, pp. 1–27.

Thomas, Research, Engineering Design and Operation of a Pressure Hydrometallurgy Facility for Gold Extraction, Toronto, Canada, 1994.

GOLD RECOVERY USING CONTROLLED OXYGEN DISTRIBUTION PRESSURE OXIDATION

BACKGROUND OF THE INVENTION

This invention relates to the recovery of gold from ores and, more particularly, to an improved pressure oxidation process for the recovery of gold from refractory sulfidic ores.

In order to oxidize sulfide sulfur, refractory ores may be treated by pressure oxidation before leaching. If the sulfide sulfur is not substantially oxidized, leaching is inhibited and gold remains locked in the sulfides. By treating the ore in an aqueous slurry at elevated temperature and oxygen pressure, the sulfur is oxidized and removed from the ore; thereafter, the gold is readily leached with a leaching agent such as cyanide, and acceptable yields result. Thereafter the gold is readily leached and acceptable yields result.

Pressure oxidation is typically performed by passage of ore slurry through a multi-compartmented autoclave to which an oxygen-containing gas is continuously supplied. Oxygen is provided by an oxygen plant proximate the autoclave. To assure substantially complete oxidation of sulfide sulfur, excess oxygen is typically fed to an industrial scale pressure oxidation autoclave. A portion of the oxygen reacts with sulfides in the ore and a portion remains unreacted and passes through the autoclave. Because a substantial portion is not used, pressure oxidation systems have higher oxygen plant capital, maintenance and operational expenses than if the oxygen were used more efficiently.

Pressure oxidation systems typically accomplish most of the sulfide sulfur oxidation in the early stages, especially in the first compartment, of the autoclave.

SUMMARY OF THE INVENTION

Among the several objects of the invention, therefore, is the provision of a pressure oxidation process characterized by more effective and efficient oxygen utilization and the provision of such a process characterized by increased rates of throughput and reduced capital costs.

Briefly, therefore, the invention is directed to a process for recovering gold from a refractory auriferous ore containing sulfide sulfur. An aqueous ore slurry is formed and subjected to pressure oxidation in an autoclave having at least three compartments comprising a first compartment, a last compartment, and one or more intermediate compartments. The pressure oxidation comprises passing the ore slurry in series through the compartments and introducing oxygen while agitating the slurry and maintaining it at a temperature of greater than about 180° C. The molar ratio of oxygen introduced into the first compartment to sulfide sulfur in the ore is no greater than the stoichiometric molar ratio required to oxidize 75% of the sulfide sulfur in the ore. Gold is then recovered from the oxidized ore slurry.

The invention is also directed to a gold-recovery process in which an aqueous slurry of refractory auriferous ore is formed and subjected to pressure oxidation in an autoclave having at least three compartments comprising a first compartment, a last compartment, and one or more intermediate compartments. The ore slurry is passed in series through the compartments and oxygen is introduced into the compartments while the slurry is agitated and maintained at a temperature of greater than about 180° C. The flowrate of oxygen to the first compartment is between about 0.1 and about 0.5 times the flowrate of oxygen to all of the compartments. Gold is subsequently recovered from the oxidized ore slurry.

The invention is further directed to a gold-recovery process in which an aqueous slurry of refractory auriferous ore is formed and subjected to pressure oxidation in an autoclave having at least three compartments comprising a first compartment, a last compartment, and one or more intermediate compartments. The ore slurry is passed in series through the compartments and oxygen is introduced into the compartments while the slurry is agitated and maintained at a temperature of greater than about 180° C. The molar ratio of oxygen introduced into the first compartment to sulfide sulfur in the ore being maintained between about 0.8 and about 1.3. Gold is then recovered from the oxidized ore slurry.

Still further, the invention is directed to a gold-recovery process in which an aqueous slurry of refractory auriferous ore is formed and subjected to pressure oxidation in an autoclave having at least three compartments comprising a first compartment, a last compartment, and one or more intermediate compartments. The ore slurry is passed in series through the compartments and oxygen is introduced into the compartments while the slurry is agitated and maintained at a temperature of greater than about 180° C. The ratio of total oxygen to sulfide sulfur is controlled and the distribution of oxygen among the compartments is controlled such that at least about 75% of the total oxygen introduced into the compartments is consumed by oxidation of sulfide sulfur in the ore and at least about 90% of the sulfide sulfur in the ore is oxidized. Gold is then recovered from the oxidized ore slurry.

Finally, the invention is directed to a gold-recovery process in which an aqueous slurry of refractory auriferous ore is formed and contacted with sulfuric acid to remove natural carbonates from the ore. The slurry is then subjected to pressure oxidation in an autoclave having at least three compartments comprising a first compartment, a last compartment, and one or more intermediate compartments. The pressure oxidation comprises passing the ore slurry in series through the compartments and introducing oxygen into the compartments while agitating the slurry therein and maintaining it at a temperature of greater than about 180° C. The molar ratio of total oxygen introduced into the compartments to sulfide sulfur in the ore passed through the compartments is between about 2 and about 4 and the molar ratio of oxygen introduced into the first compartment to sulfide sulfur in the ore is maintained below about 0.9. The oxidized ore slurry is cooled to a temperature of between about 90° F. and 140° F. The cooled oxidized slurry is neutralized to a pH of between about 9 and about 11.5, and gold is recovered from the slurry by adding cyanide to form a gold-cyanide complex and adsorbing the gold-cyanide complex onto a source of added carbon.

Other objects and features of the invention will be in part apparent and in part pointed out hereinafter.

DETAILED DESCRIPTION OF THE INVENTION

The present invention provides an improved process for recovery of gold from refractory auriferous ores, including relatively lean ores containing as low as 0.065 oz Au per ton. The process is effective for recovery of gold from ores such as those found at American Barrick's Goldstrike property in Nevada, which are sulfidic, and contain iron, arsenic and other heavy metals. In accordance with the process, the various constituents are oxidized under acidic conditions in a pressure oxidation operation, the sulfuric acid is neutralized and oxides and salts are precipitated in a neutralization operation and gold is recovered from the oxidized and neutralized slurry. Preferably, the neutralized slurry is subjected to carbon-in-leach cyanidation, preferably in a continuous countercurrent manner, for recovery of gold.

Figure 1:
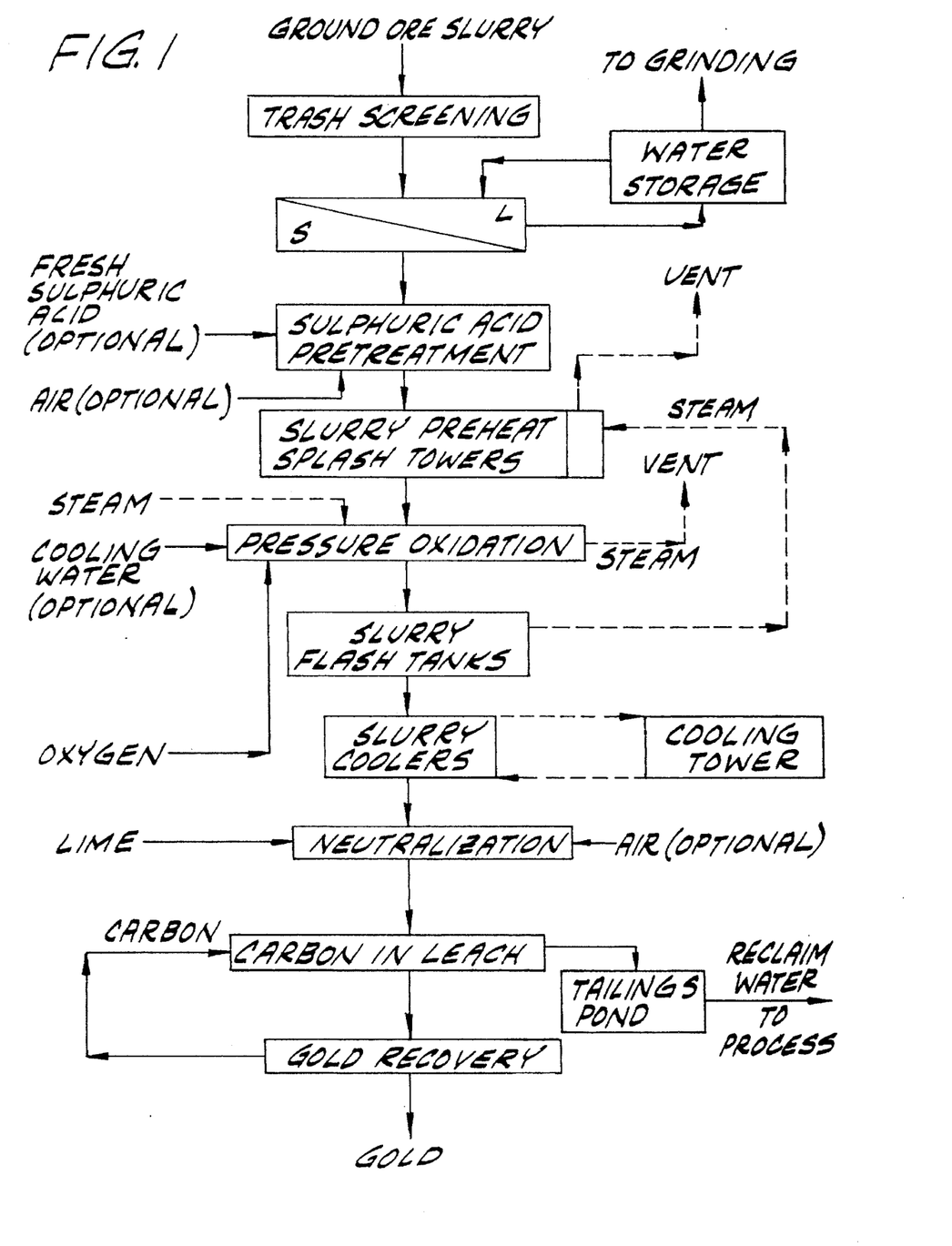
FIG. 1 is a flowsheet of one embodiment of the invention.

Illustrated in FIG. 1 is a preferred process of the invention. According to the process of this flowsheet, the ore is crushed and wet milled, and the ground ore slurry screened for trash or tramp material. Next the ground ore is thickened by removal of excess water in a solid-liquid separation operation.

It is generally necessary to acidulate the ore with sulfuric acid to neutralize all or part of the carbonate. Depending on the carbonate content of the ore, acidulation may be required continuously to a varying degree or may only be required during start-up.

The ore slurry is subjected to pressure oxidation in an autoclave in the presence of sulfuric acid using oxygen gas at elevated pressure. Although the ore may be processed in the autoclave on a batch or a continuous basis, treatment on a continuous basis is preferred. A single, multi-compartmented autoclave is preferred but multiple separate autoclave vessels may be used. References herein to "autoclave" and "compartments" encompass a single, multi-compartmented autoclave as well as an autoclave system comprising of multiple, separate, autoclave vessels. Sulfide sulfur is oxidized, thereby releasing gold from the refractory sulfide matrix within which it is embedded. It is sometimes necessary to introduce sulfuric acid into the autoclave feed in order to promote rapid oxidation of sulfide sulfur in the ore and achieve maximum release of the gold entrapped in the sulfide. Sulfuric acid is produced in situ as the oxidation proceeds, but an outside source of acid may be necessary to initiate the reaction and achieve adequate productivity. An excess of sulfuric acid is maintained during oxidation in order to promote substantially complete oxidation and ensure that the gold-entrapping sulfide sulfur content of the oxidized slurry is reduced to a practical minimum so as to minimize the amount of gold ending up in the leach tailings. However, the amount of excess acid is controlled since excess acid must be neutralized prior to cyanidation. The concentration of excess acid, expressed in grams of acid per liter of solution, is preferably less than about 25 grams per liter (gpl), more preferably less than about 10 gpl, and most preferably between about 5 and 10 gpl. By controlling the amount of excess sulfuric acid in the oxidized slurry, not only is there a reduction in the amount of lime used and the quantity of salts generated, but the equipment ancillary to the autoclave can be manufactured from less costly materials of construction. For example, items of equipment, piping, valves and the like can be constructed of lower grade alloys instead of costlier, more acid-resistant materials as has been the prior practice.

In an alternative embodiment of the process of the invention, pressure oxidation is carried out under alkaline conditions. Alkaline conditions are imparted by alkaline material indigenous to the ore, such as carbonates, and/or by added alkaline material, such as lime or sodium carbonate. Although many auriferous ores are not rendered sufficiently amenable to gold recovery by alkaline pressure oxidation, for those ores for which this alternative procedure is feasible, savings in sulfuric acid use and neutralization operation costs are among the advantages achieved.

In practice, the amount of sulfide sulfur which must be oxidized depends on the nature of the sulfides present and the distribution of the gold in the various sulfides. Typically, oxidation of 50–95% of the sulfide sulfur is advantageously practiced.

Energy from the exothermic pressure oxidation is recovered by heat exchange between the oxidized slurry and feed to the autoclave. As indicated in FIG. 1, this heat exchange is preferably effected by letting down the pressure of the oxidized slurry and using the steam which is flashed from the oxidized slurry to heat the autoclave feed, preferably by direct contact in splash condensers positioned ahead of the autoclave.

After the oxidized slurry is partially cooled by flashing of steam, it is further cooled and then passed directly to a neutralization operation. Although an intermediate washing and/or liquids-solids separation step may be employed, direct neutralization after cooling is preferred to minimize capital costs. Here lime and/or other base is added to increase the pH and render the slurry amenable to subsequent cyanide leaching. Gold may be recovered from the neutralized oxidized slurry by various methods known to the art, but is preferably recovered by carbon-in-leach cyanidation, most preferably in a continuous countercurrent system.

Figure 2:
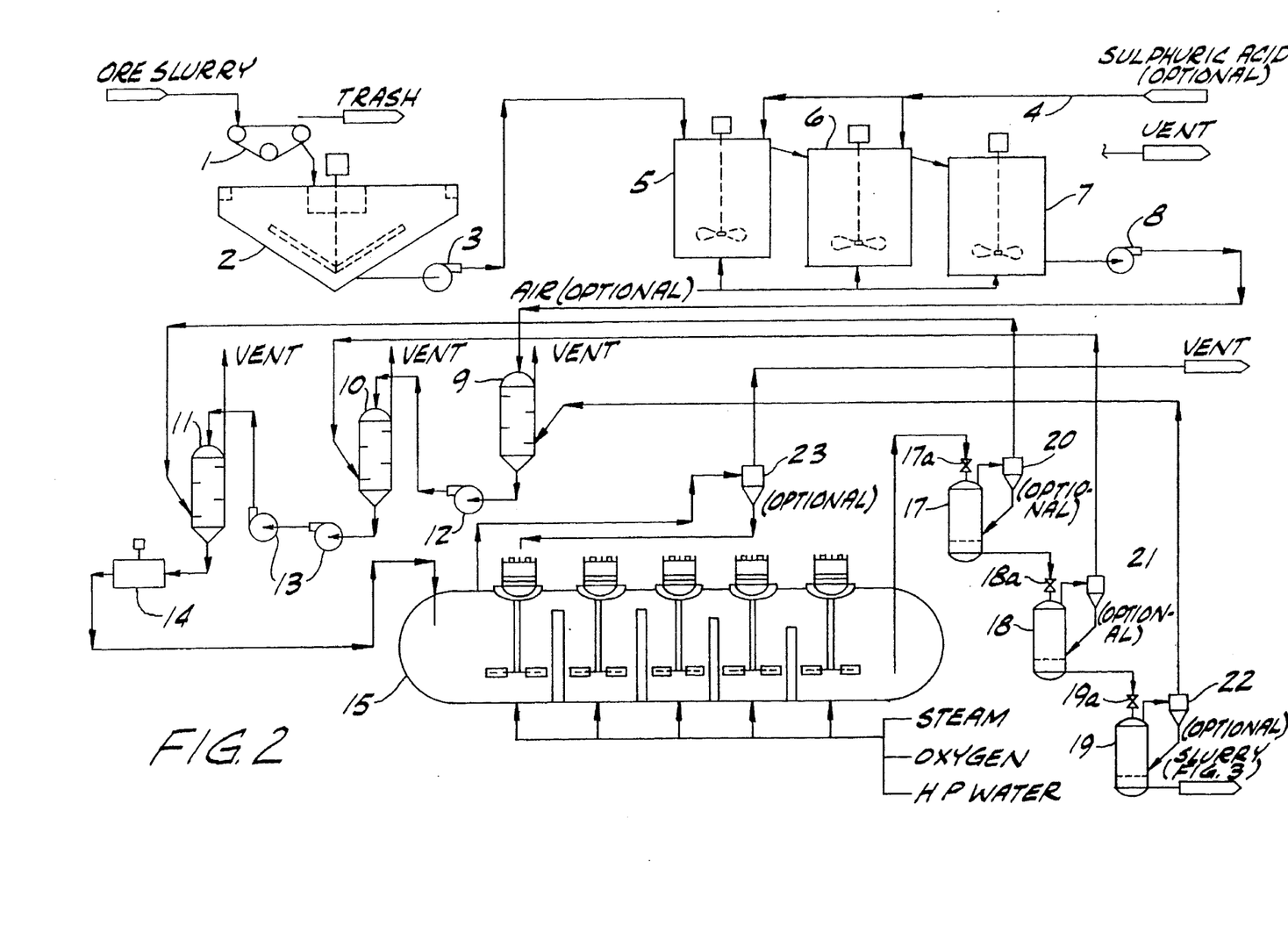
FIG. 2 is a more detailed flowsheet illustrating an embodiment of the invention.

Referring to FIG. 2, a particularly preferred embodiment of the invention will be described in detail. Ground ore slurry, a substantial fraction of which, for example 65–85% by weight, passes 200 mesh, is directed to a trash screen 1 where rock, wood fiber, trash and plastic larger than 30 mesh are separated and removed. The ore slurry passing through the screen is directed to a mechanical thickening device 2, typically a vertical tank of large diameter which provides a net vertical flow low enough to permit sedimentation of the solid particles. In the thickener, the concentration of the ore slurry is increased from a range of about 10–25% by weight to a range of about 40–55%, preferably 50–55%, by weight to minimize autoclave size and therefore capital costs. To promote separation of solids, a flocculant is preferably added to the thickener, for example, the polymeric flocculant sold under the trade designation Percol 351 or Superfloc 216, at a dosage of about 0.05 to about 0.2 pounds per ton of ore and at a concentration of about 0.01% to about 2% by weight into the thickener feed. Overflow from the thickener is recycled to the grinding circuit. Thickened ore slurry underflow from the thickener is directed by a transfer pump 3 to a series of stirred acidulation tanks 5, 6 and 7, through which the slurry passes continuously. A fresh sulfuric acid stream (optional) 4 is added to the acidulation tanks in order to release carbon dioxide from the carbonate contained in the slurry, and thereby reduce the equivalent carbon dioxide levels in the ore. Whereas the ore fed to the acidulation operation may typically contain up to about 10% $CO_3$, the feed to the autoclave preferably contains no more than about 3% $CO_3$. To promote removal of $CO_2$, compressed air may be sparged into the acidulation tanks.

Residue slurry leaving the acidulation tanks, having an adjusted solids content of at least about 30%, preferably about 40–50%, optimum of 50–55% by weight, is fed by a transfer pump 8 to the first of a series of brick lined splash condensers 9, 10 and 11, in which the treated feed slurry for the pressure oxidation step is preheated by contact with steam flashed from the oxidized slurry leaving the pressure oxidation. The successive splash condensers are each, preferably, internally baffled to promote contact between steam and liquid, and are respectively operated at progressively higher pressure and temperature. Centrifugal pumps are interposed to increase the pressure of the slurry between condensers, pump 12 transferring the slurry from condenser 9 to condenser 10, and pumps 13 transferring the slurry from condenser 10 to condenser 11. Preferably, condenser 9 is operated at about atmospheric pressure, condenser 10 is operated at a medium pressure, and condenser 11 is operated under a higher steam pressure. Addition of live steam to the slurry leaving the last splash condenser may be indicated for bringing the slurry to a temperature of at least about 175°–108° C., at which the exothermic pressure oxidation reactions are proceeding at a high rate.

Pressure oxidation is carried out in an autoclave 15, having a number of segmented, agitated compartments, preferably multi-lined, the last lining being brick, to which the slurry is transferred, preferably by a diaphragm pump 14, from the last splash condenser 11. The compartments of the autoclave are preferably of substantially equal volume. Due to the dished ends of the first and last autoclave compartments, however, these compartments are often slightly larger. Although the first compartment may be slightly larger than the intermediate compartments, the volume of slurry in the first compartment during pressure oxidation is not greater than about 1.3 times, often not greater than 1.2 times, the volume of slurry in any one of the successive compartments.

In the autoclave, the slurry is passed through the plurality of compartments at a rate which provides a total retention time on the order of 30–100 minutes, and is contacted in the presence of sulfuric acid with oxygen gas at a temperature of between about 185° and about 235° C., an oxygen partial pressure of at least about 20 psi and a total pressure of between about 400 and about 500 psia. Preferably, the temperature of the pressure oxidation is controlled at a level no higher than about 235° C. Temperature is controlled by a variety of means, including venting tailgas from the autoclave, venting steam, as from last splash condenser tank 11 of FIG. 2, and/or injecting cold water directly into the autoclave compartments. The final acidity of the slurry leaving the last compartment of the autoclave is between 5 and 25 grams sulfuric acid per liter of solution, and the final emf of the slurry is between about 480 and about 530 mv.

Oxygen is introduced to each compartment by way of sparge pipes, which extend from the top of the autoclave, down along the autoclave wall, and to a position underneath the agitators. Oxygen is flowed through the sparge pipes and injected into the slurry beneath the agitator in each compartment. A rotameter for each compartment monitors the flow of oxygen thereto and associated valves are used to control such flow, manually or automatically. It has been discovered that by carefully controlling the distribution of oxygen to the various compartments of the autoclave, increased oxygen utilization can be achieved without sacrificing gold recovery. Oxygen utilization is estimated from the plant data relating to oxygen flowing into and out of the autoclave. The percent oxygen utilization corresponds to the ratio of oxygen used in the autoclave to oxygen introduced into the autoclave and is determined as follows, where $O_i$ is the oxygen introduced into the autoclave and $O_0$ is the oxygen passing through the autoclave: % Ox. utilization $=100\times(O_i-O_0)\div O_i$. Overall oxygen utilization of between 45% and 95%, preferably at least about 60%, more preferably at least about 70%, and most preferably about 75–85%, is achieved by this invention.

The ratio of total oxygen introduced into the autoclave to auriferous ore passed through the autoclave is preferably between about 1.2 and 2 times, more preferably not greater than about 1.5 times, the stoichiometric ratio sufficient for oxidation of 100% of the sulfide sulfur in the ore. In one preferred embodiment, for example, the total oxygen introduced is about 1.33 times the stoichiometric ratio sufficient for oxidation of 100% of the sulfide sulfur in the ore. In instances where there may be occasional portions of a continuous ore charge which have sulfide "spikes" (periodic or occasional instances of unusually high sulfide sulfur content), it is desirable to introduce sufficiently excess oxygen into the autoclave sufficient to oxidize the higher proportions of sulfide. This prevents portions of ore feed having such sulfide spikes from passing through the autoclave unoxidized, and therefore prevents the passage therethrough of occluded gold which has not been rendered amenable to gold recovery. If there is a substantial risk that such spikes will be encountered, therefore, total oxygen feed is preferably maintained at a rate high enough so that targeted oxygen utilization is not greater than about 75%, thereby ensuring that there is sufficient excess oxygen for substantially complete oxidation.

The oxygen flow to the autoclave and to the specific compartments of the autoclave is increased or decreased depending on the amount of sulfide sulfur to be oxidized in the incoming ore feed. The sulfide sulfur in the ore feed is monitored periodically by analytical techniques, preferably by infrared spectroscopy of samples taken from vessels 2 and 7 in the FIG. 2 flowsheet. Using this information, oxygen flow is adjusted as described herein to achieve the desired oxidation and oxygen utilization. In particular, a determination of the desired oxygen flow and adjustment thereof, if indicated, are made about every 1 to 8 passes of ore through the autoclave, more preferably about every 2 to 5 passes through the autoclave, most preferably about every 2 to 4 passes through the autoclave. In one particularly preferred embodiment, for example, where the residence time in the autoclave is 60 minutes, the proper oxygen flow is determined and adjusted once every approximately 150 minutes, such that there is an adjustment about every 2.5 passes through the autoclave. The sulfide sulfur content used to indicate requisite oxygen flow is preferably an average of several measurements made periodically between oxygen flow adjustments.

Oxidation of the sulfides in the ore, the vast majority of which are iron sulfides, is believed to occur primarily in accordance with the following two reactions:

$$2\ FeS_2+7O_2+2H_2O\rightarrow 2\ FeSO_4+2H_2SO_4 \qquad (1)$$

$$2\ FeS_2+7.5O_2+7H_2O\rightarrow Fe_2O_3\cdot 3H_2O+4H_2SO_4 \qquad (2)$$

Stoichiometrically these equations dictate that between 1.75 [7/4] and 1.875 [7.5/4] moles $O_2$ are required to oxidize each mole $S^=$. In the Goldstrike ore the vast majority of sulfides which must be oxidized are the gold-occluding sulfidic minerals pyrite and marcasite.

Oxygen is distributed such that the ratio of oxygen introduced into the first compartment to sulfide sulfur in the ore is the stoichiometric ratio sufficient for oxidation of no more than about 75%, preferably about 20% to about 75%, more preferably no more than about 65%, still more preferably about 20% to about 60%, and most preferably about 50%, of the sulfide sulfur in the ore. The ratios referred to herein are based on steady state conditions or cumulative averages of ore and oxygen introduction into the autoclave. In order to conservatively calculate the molar ratio of oxygen to sulfide sulfur which corresponds to these oxidation percentages, it is assumed that seven moles oxygen are required to oxidize every four moles sulfide sulfur. In practice, more oxygen would be required because not all oxidation occurs via reaction (1) and because some oxygen passes through the first compartment unreacted, i.e., oxygen utilization is less than 100%. Accordingly, the molar ratio of oxygen introduced into the first compartment to sulfide sulfur in the ore is not greater than about 1.3, preferably between about 0.8 and about 1.3, more preferably not greater than about 1.1, still more preferably between about 0.8 and about 1.1, and most preferably not greater than about 0.9. Because the oxygen introduced into the first compartment is significantly below the stoichiometric proportion, relatively high oxygen utilization, approaching 100% in some instances, is achieved in the first compartment.

The rate of sulfide oxidation and percent sulfide oxidation in the first compartment are a function of the rate of oxygen introduction and percent utilization. As the rate of oxygen introduction into the first compartment decreases and oxygen utilization in the first compartment increases, the percent sulfide oxidation in that compartment decreases. The flowrate of oxygen to the first compartment is between about 0.1 and about 0.5 times, preferably no greater than 0.4 times, and more preferably between about 0.3 and about 0.4 times, the total flowrate of oxygen to all compartments. By selecting a decreased rate of oxygen introduction into the first compartment in accordance with this invention, productivity, in terms of sulfide oxidation in the first compartment, is less than if not controlled in this manner in order to increase efficiency in terms of oxygen utilization.

The rate at which oxygen is introduced to the first compartment (T1) is determined using the following equation:

$$T1\ (lb/hr.\ O_2) = TPH \times (\%S/100) \times (\%\ Oxid./100) \times (1.75/(\%\ utilization/100)) \times 2000 lbs/ton. \qquad (3)$$

The tons per hour ore feed (TPH) and %S therein are measured. Percent oxidation in the first compartment is not measured, but is a selected maximum percent which would be achieved under ideal conditions if the solved-for lb/hr oxygen were introduced thereto and 100% efficiency were achieved. The selected percent oxidation (% Oxid.) in the first compartment is between about 40% and about 80%, preferably between about 40% and 60%. By solving for and selecting a relatively modest oxygen input that would achieve 40% to 60% sulfide oxidation, an oxygen-deficient system is created in which the affinity of sulfides for oxygen is high and oxygen utilization is correspondingly high. However, the solution to equation (3) is a lb/hr $O_2$ feed which actually results in a percent oxidation lower than the selected percent. The actual percent sulfide oxidation is lower because the mechanics of mixing and flow of oxygen through the slurry into the headspace above the slurry do not allow 100% utilization, because the 1.75 factor represents the most efficient iron sulfide oxidation reaction [equation (2)], while in reality a portion of the iron sulfide is oxidized less efficiently [equation (1)], and because a portion of the oxygen is ordinarily consumed by minor reactions other than oxidation of gold-occluding iron sulfides.

By way of example, when 100 tons per hour (TPH) ore feed, dry weight, is charged to the autoclave and the ore is determined to contain, for example, 2.4% sulfide sulfur, oxygen sufficient to oxidize no more than 50% of the $S^=$ is to be introduced, as is most preferred, and assuming 100% $O_2$ utilization in the first compartment, the lbs/hr oxygen supplied to the first compartment is determined to be 4200:

$$T1(lb./hr.\ O_2) = 100\ THP \times (2.4\%S/100) \times \qquad (3a)$$
$$(50\%\ Oxid./100) \times (1.75/(100\%\ utilization/100)) \times$$
$$2000\ lbs/ton = 4200\ lbs/hr\ O_2.$$

By introducing 4200 lbs/hr $O_2$ to the autoclave under these conditions, relatively high oxygen utilization in the first compartment is achieved, while no more than 50% of the sulfide sulfur in the ore is oxidized therein.

The total quantity of oxygen introduced to all compartments is determined as follows:

$$T(lb/hr.\ O_2) = TPH \times (\%S/100) \times (\%\ Oxid./100) \times (1.875/(\%\ utilization/100)) \times 2000 lbs/ton. \qquad (4)$$

Accordingly, when the 100 tons per hour (TPH) ore feed is charged to the autoclave and the ore is determined to contain, for example, 2.4% sulfide sulfur, 95% total oxidation is assumed to be achieved, and 60% $O_2$ utilization is anticipated, the tons per hour oxygen supplied to the autoclave is determined to be 14250:

$$T\ (lb./hr.\ O_2) = 100\ THP \times (2.4\%S/100) \times \qquad (4a)$$
$$(95\%\ Oxid./100) \times (1.875/(60\%\ utilization/100)) \times$$
$$2000\ lbs/ton = 14250\ lbs/hr\ O_2.$$

The total quantity of oxygen introduced is such that the molar ratio of the total oxygen introduced into all compartments to the sulfide sulfur in the ore is between about 2 and about 4.

With respect to the compartment immediately succeeding the first compartment of the autoclave, the weight ratio of oxygen introduced thereto to oxygen introduced to the first compartment is at least about 0.5, preferably between about 0.5 and 2.0, more preferably at least about 0.8, and most preferably about 1.0. The ratio of the oxygen introduced into this second compartment to the auriferous ore passed therethrough is between about 0.25 times and about 1.0 times, preferably between about 0.35 and about 0.75 times, most preferably about 0.5 times, the stoichiometric ratio sufficient for oxidation of 100% of the sulfide sulfur in the ore.

The quantity of oxygen introduced to each subsequent compartment gradually decreases. Of the total quantity of oxygen introduced into the autoclave, between about 20% and 45%, preferably between about 25% and 40%, most preferably between about 25% and 35%, is introduced into the first compartment. In comparison to previous methods where 50% or more of the total oxygen is introduced into the first compartment, therefore, oxygen distribution to the first compartment is decreased in favor of distribution to downstream compartments. For example, in one preferred embodiment, the first and second compartments each receive between about 25% and 35% of the total oxygen and the downstream compartments receive the remaining about 50% to 30%.

In a five compartment autoclave, the first compartment and second compartments preferably receive about 20–40% of the total oxygen, the third compartment receives about 10–30% of the total oxygen, the fourth compartment receives about 5–20% of the total oxygen, and the fifth compartment receives about 1–15% of the total oxygen. In a particularly preferred embodiment using a five-compartment autoclave, the first and second compartments receive about 25–35% of the total oxygen, the third compartment receives about 15–25%, the fourth compartment receives about 7–17%, and the fifth compartment receives about 3–13%.

In a four compartment autoclave, the first compartment and second compartments each preferably receive about 20–40% of the total oxygen, the third compartment receives about 10–30% of the total oxygen, and the fourth compartment receives about 5–20% of the total oxygen.

In one particularly preferred embodiment employing a five-compartment autoclave and wherein T1, the lbs/hr oxygen to the first compartment, is 4200 for example, and T, the total oxygen introduced to all compartments, is 14250, as calculated above in equations 3a and 4a, the oxygen flow rates, T2 through T5, to compartments 2 through 5, respectively, are as follows:

$$T2=T1=4200 \text{ lbs/hr} \qquad (5)$$

$$T3=0.50\times(T-2\cdot T1)=2925 \text{ lbs/hr} \qquad (6)$$

$$T4=0.30\times(T-2\cdot T1)=1755 \text{ lbs/hr} \qquad (7)$$

$$T5=0.20\times(T-2\cdot T1)=1170 \text{ lbs/hr} \qquad (8)$$

By the controlled oxygen distribution method as described, increased oxygen utilization is achieved without any sacrifice in gold recovery by comparison to systems not using this method. Oxygen plant capital, maintenance and operational expenses are reduced due to the more efficient use of oxygen. The more efficient use of oxygen achieved by this method allows for the use of a smaller autoclave to process the same tonnage of ore, an increased rate of ore throughput, and/or the use of less oxygen to process the same tonnage of ore, in comparison to previous methods.

Continuing the gold recovery process as shown in FIG. 2, noncondensables and steam generated during the pressure oxidation operation are vented optionally through a cyclone 23 which separates entrained solids for return to the autoclave. Oxidized slurry leaving the autoclave is passed to a series of flash tanks 17, 18, and 19, through control valves 17a, 18a, and 19a, respectively, where steam is flashed off to cool the slurry. Steam from each flash tank is recycled and contacted with autoclave feed slurry in a complementary splash condenser, operated at substantially the same pressure as the flash tank, for preheating the feed slurry. Thus, in the series as illustrated in FIG. 2, the first flash tank 17 is coupled to the last splash condenser 11, the second flash tank 18 is coupled with the second condenser 10, and the last flash tank 19 is coupled with the first splash condenser 9. Typically, between 1 and 3 flash tanks and between 0 and 3 condensers are employed.

Steam leaving each of flash tanks 17, 18 and 19 is optionally passed through a cyclone 20, 21 and 22, respectively, for recovery of entrained solids. An alternative to using cyclones is to use larger diameter flash tanks, reducing the number of items of equipment thereby simplifying maintenance and operations. The recovered solids are blended back into the oxidized slurry.

Figure 3:
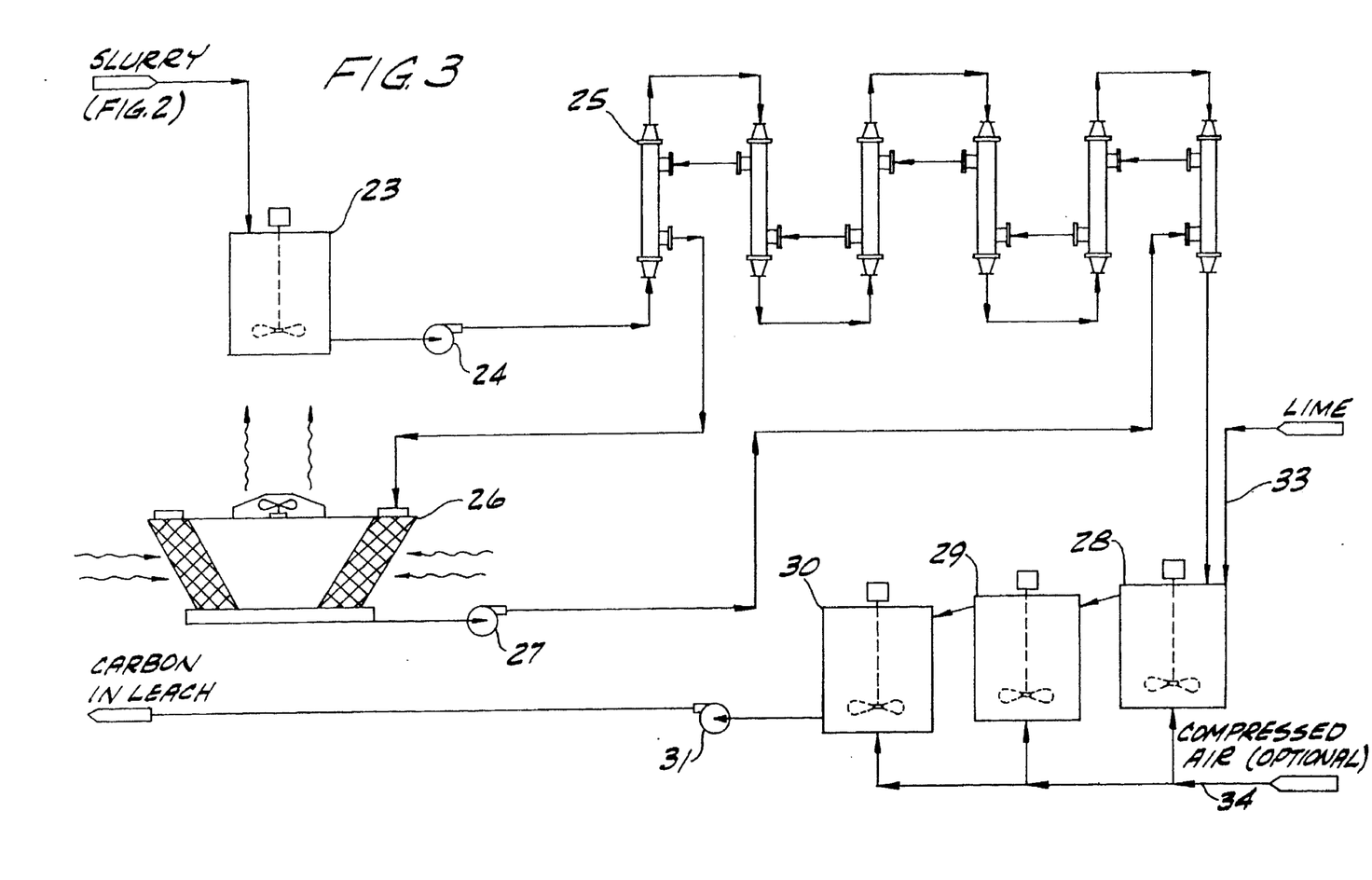
FIG. 3 is a more detailed flowsheet illustrating the cooling and neutralizations steps in a preferred embodiment of the invention.

Referring to FIG. 3, hot oxidized slurry from the autoclave flash tank 19, having a solids content of at least about 30% by weight, preferably at least about 35% by weight, and containing soluble sulfates, iron salts, arsenates, etc., is transferred to an intermediate agitated storage tank 23. In order to condition the slurry for gold recovery operations, the temperature of the hot oxidized slurry is reduced to between about 90° F. and about 140° F., preferably between about 100° F. and about 120° F., by passing the slurry, by means of pump 24, through a series of shell and tube coolers 25. The temperature of the slurry is reduced by exchanging heat from the slurry to a cooling water stream. Cooling water is obtained from a recirculating system in which the water is recycled through a crossflow, induced draft cooling tower 26 by pump 27.

Cooled oxidized slurry which is discharged from the coolers 25 is fed continuously through a series of rubber or epoxy lined agitated neutralization tanks 28, 29 and 30. In accordance with the process described in U.S. Pat. No. 5,071,477, which is expressly incorporated herein by reference, the cooled oxidized slurry may be directly neutralized without either washing the slurry or separating solids therefrom prior to neutralization. By omitting any washing operation between the autoclave and the neutralization operation, as is preferred but not required, the volume of materials handled is reduced and the need for other ancillary operations such as wash water recovery is avoided. In the neutralization operation the slurry is neutralized with a slurry of lime and/or other base to raise its pH to between about 9 and about 11.5, preferably between about 10 and about 11, preferably about 10.5. Lime is highly preferred but the neutralization may be carried out with other bases which form substantially insoluble sulfate salts on reaction with sulfuric acid and are capable of raising the pH to a level at which iron and arsenate salts are precipitated. Compressed air 34 is optionally sparged into the slurry in the neutralization tanks to convert ferrous iron to ferric iron, as the former consumes cyanide in the subsequent carbon-in-leach operation. The neutralized slurry, having a solids content of 30–40% by weight and a temperature of about 25°–35° C., is then directed to a carbon-in-leach operation by transfer pump 31.

The gold may be recovered from the oxidized slurry by any of a number of means presently known or hereafter developed. Preferably, the gold in the oxidized slurry is recovered by a conventional carbon-in-leach (C-I-L) cyanidation or cyanidation followed by carbon-in-pulp (C-I-P) (not shown in detail) in which the neutralized slurry is passed to a series of agitated carbon-in-leach tanks countercurrently to a flow of granular activated carbon. Loaded carbon recovered from the carbon-in-leach operation is stripped with hot alkaline cyanide solution and gold is recovered from the stripping solution by conventional means such as electrowinning and refining (not shown).

The process of the invention provides for high recovery of gold, for example, in a yield exceeding 80%, from refractory auriferous ores containing 0.065 or less up to about 0.50 oz gold per ton. It is effective for removing contaminating elements such as iron, arsenic, nickel, and zinc from the oxidized slurry, and can be implemented with relatively modest capital investment. The autoclave conditions and means for recovery of exothermic reaction heat provide not only efficient gold recovery but efficient use of energy.

In another embodiment (not shown) the transfer of heat from the oxidized slurry to the treated slurry autoclave feed can be accomplished by indirect heat exchange rather than by coupled flash tanks and splash condensers. In that embodiment the indirect heat exchanger is preferably a double pipe exchanger in which the inner pipe is constructed of an acid resistant metal or alloy and the outer pipe of steel. The oxidized slurry is passed through the interior pipe and the relatively cold pressure oxidation feed slurry is passed through the annular space between the pipes. The interior pipe of the heat exchanger, which is in contact with the highly acidic streams leaving the autoclave need not be constructed from titanium as generally has been the practice. Instead, alloy 20 or other similar acid resistant alloy can be used, thereby significantly lowering the cost of the heat exchanger.

Further illustration of the invention is provided by the following examples:

EXAMPLE 1

Gold ore from the Barrick Goldstrike Mines Inc. in Nevada was processed according to the gold recovery circuit flow sheet of FIG. 1 continuously for thirty days. An average analysis of ore from the Goldstrike Mine is provided in Table 1.

TABLE 1

| Element | lb/t | % or ppm |
|---|---|---|
| Oxygen | 870 | 43.0% |
| Silicon | 620 | 31.0% |
| Calcium | 80 | 4.0% |
| Aluminum | 80 | 4.0% |
| Sulfur | 50 | 2.5% |
| Iron | 45 | 2.3% |
| Carbon | 40 | 2.0% |
| Arsenic | 4 | 2000 |
| Zinc | 3 | 1500 |
| Sodium | 2.5 | 1250 |
| Phosphorus | 2.5 | 1250 |
| Magnesium | 2 | 1000 |
| Fluorine | 2 | 1000 |
| Nickel | 0.7 | 350 |
| Chromium | 0.5 | 250 |
| Antimony | 0.3 | 150 |
| Copper | 0.3 | 150 |
| Lead | 0.2 | 100 |

The autoclave conditions are listed in Table 2.

TABLE 2

Autoclave Feed

50% solids by weight

60% passing 200 mesh

Operating parameters

Temperature: 420° F.

Total pressure: 420 psig

Ox. overpressure: 125 psi

Mixing tip speed: 9.2 ft/s

Retention time: 47 min

The sulfide sulfur content of the ore feed to the autoclave was measured every 2 hours and every 4 hours an average sulfide sulfur content was determined and the desired oxygen distribution calculated. The ore feed tons per hour (TPH) was determined by density and flow readings and used in equations (3) and (4) above to determine the desired total flow of oxygen to the autoclave and to compartment 1. Total oxidation was assumed to be 95%, with targets of 47% oxidation in the first compartment and 70% overall oxygen utilization. Equations (5) through (8) were used to calculate the desired oxygen flow to compartments 2 through 5. For purposes of illustration, calculated targets and actual local rotameter values for one day's operation are presented in Table 3.

TABLE 3

| TPH: | 119 | Sulfide sulfur (avg): | 2.2% |
|---|---|---|---|
| Total press. (avg): | 420 psig | Ox. overpress. (avg): | 72 psig |

| Oxygen Flow (lbs/hr) | Calculated | Actual |
|---|---|---|

TABLE 3-continued

| Compartment 1 | 4307 | 4598 |
|---|---|---|
| Compartment 2 | 4307 | 4445 |
| Compartment 3 | 2355 | 2541 |
| Compartment 4 | 1413 | 1509 |
| Compartment 5 | 942 | 988 |
| Total | 13324 | 14081 |

From analysis of the slurry exiting the autoclave it was determined that 69% oxygen utilization and 96.6% total oxidation were achieved.

For thirty days continuous operation, the oxygen utilization and total oxidation achieved using the oxygen distribution method of the invention are provided in Table 4.

TABLE 4

| Day # | TPH (avg) | % S$^=$ (avg) | total oxygen (calcul. lbs/hr) | total oxygen (actual lbs/hr) | % oxid | % oxygen utiliz |
|---|---|---|---|---|---|---|
| 1 | 122 | 2.3 | 14281 | 17324 | 95.0 | 67 |
| 2 | 119 | 2.2 | 13324 | 15148 | 93.1 | 65 |
| 3 | 69 | 2.2 | 7726 | 8864 | 88.6 | 59 |
| 4 | 109 | 2.2 | 12204 | 13776 | 95.8 | 60 |
| 5 | 122 | 2.0 | 12418 | 13054 | 95.5 | 67 |
| 6 | 121 | 2.0 | 12316 | 13032 | 91.7 | 67 |
| 7 | 111 | 2.2 | 12428 | 12948 | 95.7 | 67 |
| 8 | 115 | 2.3 | 13461 | 13840 | 93.6 | 69 |
| 9 | 115 | 2.2 | 12876 | 13840 | 96.4 | 69 |
| 10 | 119 | 2.3 | 13929 | 13604 | 94.3 | 75 |
| 11 | 119 | 2.4 | 14535 | 14240 | 96.7 | 72 |
| 12 | 113 | 2.4 | 13802 | 14847 | 97 | 67 |
| 13 | 120 | 2.4 | 14657 | 15000 | 96.1 | 69 |
| 14 | 113 | 2.4 | 13802 | 14733 | 96.2 | 69 |
| 15 | 122 | 2.2 | 13660 | 15414 | 89.9 | 60 |
| 16 | 97 | 2.2 | 10861 | 12751 | 96.5 | 63 |
| 17 | 69 | 2.3 | 8077 | 10111 | 98.8 | 54 |
| 18 | 108 | 2.2 | 12092 | 12744 | 96.6 | 67 |
| 19 | 119 | 2.2 | 13324 | 14081 | 96.6 | 69 |
| 20 | 119 | 2.4 | 14535 | 14942 | 93.3 | 72 |
| 21 | 95 | 2.4 | 11604 | 14579 | 98.5 | 57 |
| 22 | 125 | 2.2 | 13996 | 14586 | 92.1 | 69 |
| 23 | 129 | 2.4 | 15756 | 16296 | 93.8 | 69 |
| 24 | 132 | 2.1 | 14108 | 15840 | 93.5 | 63 |
| 25 | 139 | 2.1 | 14856 | 13867 | 91.6 | 72 |
| 26 | 131 | 2.0 | 13334 | 15235 | 93.8 | 60 |
| 27 | 131 | 2.1 | 14001 | 15103 | 95.2 | 72 |
| 28 | 131 | 2.5 | 16667 | 16275 | 93.8 | 72 |
| 29 | 118 | 2.4 | 14413 | 16284 | 96.4 | 65 |
| 30 | 116 | 2.7 | 15940 | 16692 | 94.8 | 72 |

The oxidized ore slurry was cooled, directly neutralized, and subjected to carbon-in-leach gold recovery.

EXAMPLE 2

Gold ore from the same source and of similar analysis as the ore of Example 1 was processed according to the procedure of Example 1 except that a target of 75% total oxygen utilization was used. For purposes of illustration, calculated targets and actual local rotameter values for one day's operation are presented in Table 5.

TABLE 5

| TPH: | 128 | Sulfide sulfur (avg): | 2.4% |
|---|---|---|---|
| Total press. (avg): | 420 psig | Ox. overpress. (avg): | 51 psig |

| Oxygen Flow (lbs/hr) | Calculated | Actual |
|---|---|---|
| Compartment 1 | 5053 | 5201 |
| Compartment 2 | 5053 | 4885 |

TABLE 5-continued

| Compartment 3 | 2243 | 2385 |
|---|---|---|
| Compartment 4 | 1346 | 1443 |
| Compartment 5 | 897 | 924 |
| Total | 14592 | 14838 |

From analysis of the slurry exiting the autoclave it was determined that 75% oxygen utilization and 90.8% total oxidation were achieved.

For thirty days continuous operation, the oxygen utilization and total oxidation achieved using the oxygen distribution method of the invention are provided in Table 6.

TABLE 6

| Day # | TPH (avg) | % S$^=$ (avg) | total oxygen (calcul. lbs/hr) | total oxygen (actual lbs/hr) | % oxid | % oxygen utiliz |
|---|---|---|---|---|---|---|
| 1 | 99 | 2.3 | 10816 | 12037 | 97.2 | 78 |
| 2 | 120 | 2.2 | 12540 | 13800 | 93.4 | 69 |
| 3 | 125 | 2.2 | 13063 | 12965 | 90.6 | 75 |
| 4 | 133 | 2.2 | 13899 | 14933 | 94.8 | 67 |
| 5 | 139 | 2.0 | 13205 | 12896 | 94.2 | 75 |
| 6 | 108 | 2.0 | 10260 | 11988 | 93.4 | 67 |
| 7 | 105 | 2.2 | 10973 | 12455 | 95.8 | 67 |
| 8 | 132 | 2.3 | 14421 | 15048 | 94 | 72 |
| 9 | 122 | 2.2 | 12749 | 14640 | 97.1 | 69 |
| 10 | 129 | 2.3 | 14093 | 13709 | 93.7 | 82 |
| 11 | 121 | 2.4 | 13794 | 13635 | 94.2 | 75 |
| 12 | 121 | 2.4 | 13794 | 13635 | 97.5 | 78 |
| 13 | 118 | 2.4 | 13452 | 13688 | 96.2 | 75 |
| 14 | 117 | 2.4 | 13338 | 14117 | 97 | 75 |
| 15 | 129 | 2.2 | 13481 | 14652 | 92.5 | 69 |
| 16 | 113 | 2.2 | 12652 | 13411 | 96.1 | 69 |
| 17 | 60 | 2.3 | 6555 | 9997 | 95 | 46 |
| 18 | 120 | 2.2 | 12540 | 13320 | 95.5 | 69 |
| 19 | 133 | 2.2 | 13899 | 13930 | 95.4 | 75 |
| 20 | 128 | 2.4 | 14592 | 14838 | 90.5 | 75 |
| 21 | 121 | 2.4 | 13794 | 13997 | 94.1 | 72 |
| 22 | 130 | 2.2 | 13585 | 14300 | 92.7 | 72 |
| 23 | 89 | 2.4 | 10146 | 13034 | 98 | 63 |
| 24 | 130 | 2.4 | 12968 | 15210 | 94.7 | 65 |
| 25 | 122 | 2.1 | 12170 | 14030 | 93.9 | 65 |
| 26 | 130 | 2.0 | 12350 | 14170 | 94 | 65 |
| 27 | 132 | 2.1 | 13167 | 15218 | 94.6 | 65 |
| 28 | 117 | 2.2 | 13894 | 14197 | 91.3 | 69 |
| 29 | 133 | 2.2 | 15162 | 15960 | 93.4 | 72 |
| 30 | 133 | 2.7 | 17057 | 17456 | 93.8 | 78 |

The oxidized ore slurry was cooled, directly neutralized, and subjected to carbon-in-leach gold recovery.

As various changes could be made in the above embodiments without departing from the scope of the invention, it is intended that all matter contained in the above description shall be interpreted as illustrative and not in a limiting sense.

What is claimed is:

1. A process for recovering gold from a refractory auriferous ore containing sulfide sulfur comprising the steps of:

forming an aqueous ore slurry comprising said refractory auriferous ore;

determining the sulfide sulfur content of the ore which forms the aqueous ore slurry;

subjecting the aqueous ore slurry to pressure oxidation in an autoclave having at least three compartments comprising a first compartment, a last compartment, and one or more intermediate compartments, said pressure oxidation comprising passing said aqueous ore slurry in series through said compartments and introducing oxygen into said compartments while agitating the aqueous ore slurry therein and maintaining said aqueous ore slurry at a temperature of greater than about 180° C.;

controlling the flow of oxygen to said first compartment on the basis of said sulfide sulfur content so that the molar ratio of oxygen introduced into the first compartment to sulfide sulfur in the ore introduced into the autoclave is no greater than the stoichiometric molar ratio required to oxidize 75% of the sulfide sulfur in said ore and distributing the flow of oxygen among said compartments on the basis of said sulfide sulfur content to achieve at least about 70% oxygen utilization thereby forming an oxidized ore slurry; and recovering gold from said oxidized ore slurry.

2. The process of claim 1 wherein the molar ratio of oxygen introduced into the first compartment to sulfide sulfur in the ore introduced into the autoclave is the stoichiometric molar ratio required to oxidize between about 20% and about 60% of the sulfide sulfur in the ore introduced into the autoclave and at least about 75% of the total oxygen introduced into said compartments is consumed oxidation of sulfide sulfur in the ore.

3. The process of claim 1 wherein the ratio of the oxygen introduced into the compartment immediately succeeding the first compartment to the auriferous ore introduced into the autoclave is between about 0.25 times and 1.0 times the stoichiometric ratio sufficient for oxidation of 100% of the sulfide sulfur in the ore introduced into the autoclave.

4. The process of claim 3 wherein the ratio of the oxygen introduced into the compartment immediately succeeding the first compartment to the auriferous ore introduced into the autoclave is between about 0.35 times and 0.75 times the stoichiometric ratio sufficient for oxidation of 100% of the sulfide sulfur in the ore introduced into the autoclave.

5. The process of claim 4 wherein the ratio of the oxygen introduced into the compartment immediately succeeding the first compartment to the auriferous ore introduced into the autoclave is about 0.5 times the stoichiometric ratio sufficient for oxidation of 100% of the sulfide sulfur in the ore introduced into the autoclave.

6. The process of claim 5 wherein the ratio of the total oxygen introduced into all compartments to the auriferous ore introduced into the autoclave is not greater than 1.5 times the stoichiometric ratio sufficient for oxidation of 100% of the sulfide sulfur in said ore and the weight ratio of oxygen introduced into the compartment immediately succeeding the first compartment to oxygen introduced into the first compartment is at least about 0.5.

7. The process of claim 6 wherein the weight ratio of oxygen introduced into the compartment immediately succeeding the first compartment to oxygen introduced into the first compartment is at least about 0.8.

8. The process of claim 7 wherein the weight ratio of oxygen introduced into the compartment immediately succeeding the first compartment to oxygen introduced into the first compartment is about 1.0.

9. A process for recovering gold from a refractory auriferous ore containing sulfide sulfur comprising the steps of:

forming an aqueous ore slurry comprising said refractory auriferous ore;

determining the sulfide sulfur content of the ore which forms the aqueous ore slurry;

subjecting the aqueous ore slurry to pressure oxidation in an autoclave having at least three compartments comprising a first compartment, a last compartment, and one or more intermediate compartments, said pressure oxidation comprising passing said aqueous ore slurry in series through said compartments and introducing oxygen into said compartments while agitating the aqueous ore slurry therein and maintaining said aqueous ore slurry at a temperature of greater than about 180° C.;

controlling the flow of oxygen to said first compartment on the basis of said sulfide sulfur content so that the molar ratio of oxygen introduced into the first compartment to sulfide sulfur in the ore introduced into the autoclave is at least about 0.8 and distributing the flow of oxygen among said compartments so that the flowrate of oxygen to the first compartment is between about 0.1 and about 0.5 times the flowrate of oxygen to all of said compartments and to achieve at least about 70% oxygen utilization, thereby forming an oxidized ore slurry; and recovering gold from said oxidized ore slurry.

10. The process of claim 9 wherein the ratio of the total oxygen introduced into all compartments to the auriferous ore introduced into the autoclave is not greater than 1.5 times the stoichiometric ratio sufficient for oxidation of 100% of the sulfide sulfur in the ore introduced into the autoclave and the flowrate of oxygen to the first compartment is no greater than about 0.4 times the flowrate of oxygen to all of said compartments and at least about 75% of the total oxygen introduced into said compartments is consumed by oxidation of sulfide sulfur in the ore.

11. The process of claim 10 wherein the flowrate of oxygen to the first compartment is about 0.3 times the flowrate of oxygen to all of said compartments.

12. A process for recovering gold from a refractory auriferous ore containing sulfide sulfur comprising the steps of:

forming an aqueous ore slurry comprising said refractory auriferous ore;

determining the sulfide sulfur content of the ore which forms the aqueous ore slurry;

subjecting the aqueous ore slurry to pressure oxidation in an autoclave having at least three compartments comprising a first compartment, a last compartment, and one or more intermediate compartments, said pressure oxidation comprising passing said aqueous ore slurry in series through said compartments and introducing oxygen into said compartments while agitating the aqueous ore slurry therein and maintaining said aqueous ore slurry at a temperature of greater than about 180° C.;

adjusting the flow of oxygen to said first compartment on the basis of said sulfide sulfur content so that the molar ratio of oxygen introduced into the first compartment to sulfide sulfur in the ore introduced into the autoclave being maintained between about 0.8 and about 1.3 and distributing the flow of oxygen among said compartments to achieve at least about 70% oxygen utilization, thereby forming an oxidized ore slurry; and recovering gold from said oxidized ore slurry.

13. The process of claim 12 wherein the molar ratio of oxygen introduced into the first autoclave compartment to sulfide sulfur in the ore introduced into the autoclave is maintained below about 1.1.

14. The process of claim 13 wherein the molar ratio of oxygen introduced into the first autoclave compartment to sulfide sulfur in the ore introduced into the autoclave is maintained below about 0.9 and at least about 75% of the total oxygen introduced into said compartments is consumed by oxidation of sulfide sulfur in the ore.

15. The process of claim 13 wherein the molar ratio of the total oxygen introduced into said at least three compartments to the sulfide sulfur in the ore introduced into the autoclave is between about 2 and about 4.

16. The process of claim 15 wherein the slurry in said first compartment has a volume during pressure oxidation which is no greater than about 1.2 times the volume of slurry in any successive compartment.

17. The process of claim 16 wherein the ratio of the oxygen introduced into the compartment immediately succeeding the first compartment to the auriferous ore introduced into the autoclave is between about 0.25 times and 1.0 times the stoichiometric ratio sufficient for oxidation of 100% of the sulfide sulfur in said ore.

18. The process of claim 17 wherein the ratio of the oxygen introduced into the compartment immediately succeeding the first compartment to the auriferous ore introduced into the autoclave is between about 0.35 times and 0.75 times the stoichiometric ratio sufficient for oxidation of 100% of the sulfide sulfur in said ore.

19. The process of claim 18 wherein the ratio of the oxygen introduced into the compartment immediately succeeding the first compartment to the auriferous ore introduced into the autoclave is about 0.5 times the stoichiometric ratio sufficient for oxidation of 100% of the sulfide sulfur in said ore.

20. The process of claim 16 wherein the ratio of the total oxygen introduced into all compartments to the auriferous ore introduced into the autoclave is not greater than 1.5 times the stoichiometric ratio sufficient for oxidation of 100% of the sulfide sulfur in said ore and the weight ratio of oxygen introduced into the compartment immediately succeeding the first compartment to oxygen introduced into the first compartment is at least about 0.5.

21. The process of claim 20 wherein the weight ratio of oxygen introduced into the compartment immediately succeeding the first compartment to oxygen introduced into the first compartment is at least about 0.8.

22. The process of claim 21 wherein the weight ratio of oxygen introduced into the compartment immediately succeeding the first compartment to oxygen introduced into the first compartment is about 1.0.

23. A process for recovering gold from a refractory auriferous ore containing sulfide sulfur comprising the steps of:

forming an aqueous ore slurry comprising said refractory auriferous ore;

determining the sulfide sulfur content of the ore which forms the aqueous ore slurry;

subjecting the aqueous ore slurry to pressure oxidation in an autoclave having at least three compartments comprising a first compartment, a last compartment, and one or more intermediate compartments, said pressure oxidation comprising passing said aqueous ore slurry in series through said compartments and introducing oxygen into said compartments while agitating the aqueous ore slurry therein, maintaining said aqueous or slurry at a temperature of greater than about 180° C., and controlling the ratio of total oxygen to sulfide sulfur and controlling the distribution of oxygen among said compartments such that at least about 75% of the total oxygen introduced into said compartments is consumed by oxidation of sulfide sulfur in the ore and at least about 90% of the sulfide sulfur in the ore is oxidized, thereby forming an oxidized ore slurry; and recovering gold from said oxidized ore slurry.

24. A process for recovering gold from a refractory auriferous ore containing sulfide sulfur comprising the steps of:

forming an aqueous ore slurry comprising said refractory auriferous ore;

determining the sulfide sulfur content of the ore which forms the aqueous ore slurry;

contacting the aqueous ore slurry with sulfuric acid to remove natural carbonates from the ore;

subjecting the aqueous ore slurry to pressure oxidation in an autoclave having at least three compartments comprising a first compartment, a last compartment, and one or more intermediate compartments, said pressure oxidation comprising passing said aqueous ore slurry in series through said compartments and introducing oxygen into said compartments while agitating the aqueous ore slurry therein and maintaining said aqueous ore slurry at a temperature of greater than about 180° C.;

controlling the flow of oxygen to said compartments on the basis of said sulfide sulfur content so that the molar ratio of total oxygen introduced into said compartments to sulfide sulfur in the ore introduced into the autoclave is between about 2 and about 4, the molar ratio of oxygen introduced into said first compartment to sulfide sulfur in the ore introduced into the autoclave is maintained below about 0.9, and oxygen utilization in all of said compartments is between about 75% and about 85%, thereby forming an oxidized ore slurry;

cooling the oxidized ore slurry to a temperature between about 90° F. and 140° F. to form a cooled oxidized slurry;

neutralizing the cooled oxidized slurry to a pH of between about 9 and about 11.5; and recovering gold from said cooled oxidized slurry by adding cyanide to said slurry to form a gold-cyanide complex and adsorbing said gold-cyanide complex onto a source of added carbon.

* * * * *

UNITED STATES PATENT AND TRADEMARK OFFICE
CERTIFICATE OF CORRECTION

PATENT NO. : 5,489,326

DATED : February 6, 1996

INVENTOR(S) : Kenneth G. Thomas, et al.

It is certified that error appears in the above-identified patent and that said Letters Patent is hereby corrected as shown below:

Column 5, line 17, "175°-108°C" should read ---175°-180°---.

Column 16, claim 23, line 55, "aqueous or slurry" should read ---aqueous ore slurry---.

Signed and Sealed this

Thirty-first Day of December, 1996

*Attest:*

BRUCE LEHMAN

*Attesting Officer*  *Commissioner of Patents and Trademarks*